F. A. STEVENS.
OPHTHALMIC MOUNTING.
APPLICATION FILED JULY 14, 1919.
1,320,655.
Patented Nov. 4, 1919.
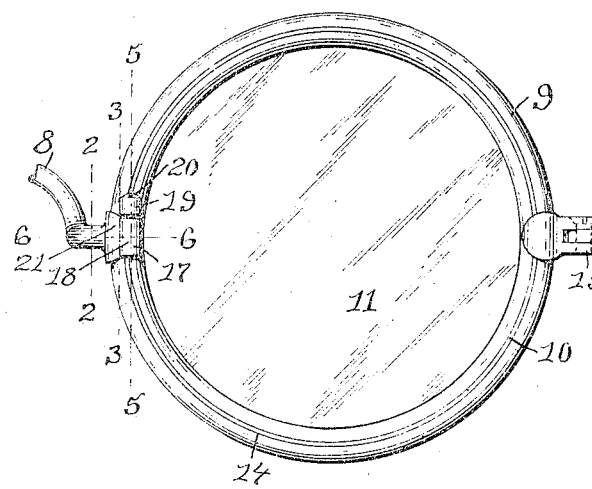
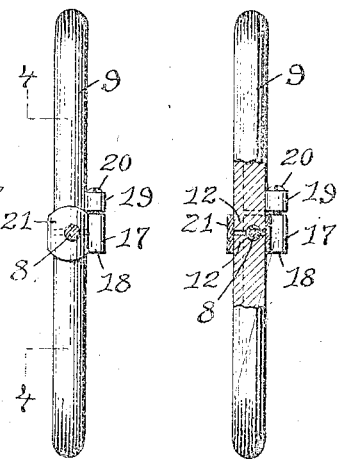
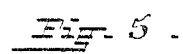
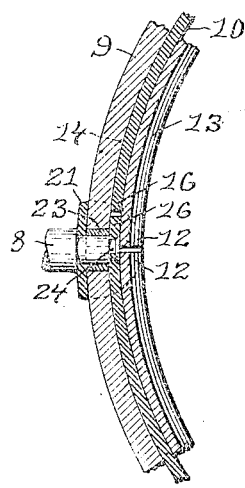
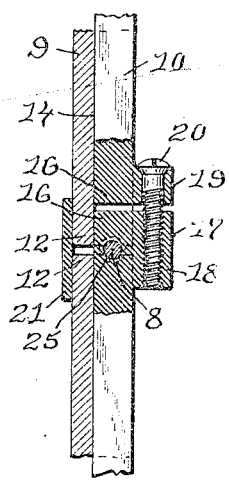
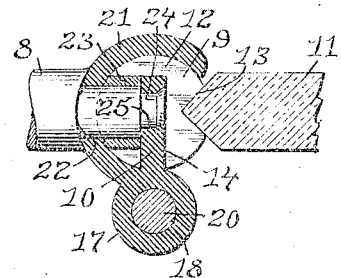
INVENTOR:
Frederick Arthur Stevens
By Chas. H. Luther
ATTORNEY.

UNITED STATES PATENT OFFICE.

FREDERICK ARTHUR STEVENS, OF PROVIDENCE, RHODE ISLAND, ASSIGNOR TO STEVENS AND COMPANY, INCORPORATED, OF PROVIDENCE, RHODE ISLAND, A CORPORATION OF RHODE ISLAND.

OPHTHALMIC MOUNTING.

1,320,655. Specification of Letters Patent. Patented Nov. 4, 1919.

Application filed July 14, 1919. Serial No. 310,823.

*To all whom it may concern:*

Be it known that I, FREDERICK ARTHUR STEVENS, a citizen of the United States, residing at Providence, in the county of Providence and State of Rhode Island, have invented a new and useful Improvement in Ophthalmic Mountings, of which the following is a specification.

My invention has reference to an improvement in optical instruments and more particularly to an improvement in ophthalmic mountings as used on spectacles, eye-glasses and the like.

In the construction of such mountings having reinforced shell or celluloid rims, as shown in United States Patent No. 1,293,232, granted to me Feb. 4, 1919, the rims separate at the temples and the reinforcing members extend out and are constructed to pivotally hold the temples in place by screws. By this construction the same screws also secure the lenses in place in the rims. This is objectionable, as the rims cannot be strengthened by breaking joints at the temples and in opening the rims to receive the lens, the temples may drop out or vice versa.

The object of my invention is to improve the construction of spectacles, eye-glasses and the like having shell or celluloid rims, whereby such rims are greatly strengthened, assembling of the parts facilitated and the cost reduced.

A further object of my invention is to construct such an ophthalmic mounting, whereby the rim joint is concealed and over size lenses may be secured in the rim, without the more or less open joint being seen.

My invention consists in the peculiar and novel construction of ophthalmic mountings as applied to spectacles, eye-glasses and the like, said ophthalmic mountings having details of construction, as will be more fully set forth hereinafter and claimed.

Figure 1 is an enlarged rear view showing the right-hand portion of a spectacle frame provided with my improved mounting.

Fig. 2 is an enlarged edge sectional view of the rim taken on line 2, 2 of Fig. 1.

Fig. 3 is a sectional view similar to Fig. 2 taken on line 3, 3 of Fig. 1.

Fig. 4 is a still further enlarged detail longitudinal sectional view, taken on line 4, 4 of Fig. 2.

Fig. 5 is an enlarged detail sectional view taken on line 5, 5 of Fig. 1, and

Fig. 6 is a greatly enlarged detail transverse sectional view taken on line 6, 6 of Fig. 1.

In the drawings 7 indicates the temple, 8 the bridge, 9 the non-metallic rim, 10 the metal reinforcing member and 11 the lens. The rim 9 is formed of a non-metallic material such as celluloid and the reinforcing member 10 is of metal. The rim 9 is split transversely forming the abutting ends 12, 12 and has a circular V shaped groove 13 for the lens 11, in its inner circumference, and a rectangular shaped groove 14 extending in from the rear edge of the rim for the reinforcing member 10. An end piece 15 which pivotally supports the temple 7, is secured at this point to the reinforcing member 10. As shown in Figs. 1, 4, 5, and 6 the reinforcing member 10 is in the form of a circular band shaped to fit in, and is driven into the groove 14 in the rim, and has the abutting end 16, 16 off set from and which overlap or break joints with the abutting ends 12, 12 of the non-metallic rim 9 thereby reinforcing and strengthening the weak non-metallic rim at this point. A fastening member 17 has an internally screw-threaded part 18 secured to the overlapping abutting end 16 and a tubular part 19 secured to the other abutting end 16 and a screw 20 which extends through the tubular part 19 and screws into the part 18, as shown in Fig. 5, the fastening member lying against the rear edge of the rim. A joint concealing shield 21 is secured to the part 18 of the fastening member and fits around the abutting ends 12, 12 of the rim 9, thereby still further strengthening the rim 9 at its weakest place, and concealing the rim joint. The end of the bridge 8 extends through a hole 22 in the shield, through a collar 23 intermediate the shield and the reinforcing member 10 and has a reduced end 24 which extends into a hole 25 in the reinforcing member 10 where it is rigidly secured by riveting or soldering the end 24 to the reinforcing member 10, as shown in Fig. 6.

By this construction the comparatively weak non-metallic rim is materially strengthened at its weakest place both circumferentially and laterally, the more or less open rim joint is concealed by the shield, the bridge is rigidly secured to the metal reinforcing member, which being at the rear of the rim, is practically concealed when in use as is also the fastening member, and standard or out size lenses may be secured in the rim, independent of the means for pivotally securing the temple to the rim.

It is evident that my improved ophthalmic mounting is equally applicable to eyeglasses, lorgnettes or the like, and that the details of construction could be varied within the scope of the appended claims.

Having thus described my invention, I claim as new:—

1. An ophthalmic mounting comprising a two part rim, one part of a non-metallic material and having abutting ends, and the other part of metal embedded in the non-metallic part and having abutting ends which overlap the abuting ends of the non-metallic part, means for holding a lens in the rim and means for drawing the abutting ends of the metal part of the rim toward each other and simultaneously drawing the abutting ends of the non-metallic part of the rim toward each other to secure the lens in the rim, whereby the ends of the non-metallic part of the rim are strengthened and held in place by the overlapping ends of the metal part of the rim.

2. An ophthalmic mounting comprising a non-metallic rim having abutting ends, a lens groove in its inner circumference, and a groove in its circumferential edge, a metal reinforcing member in the last mentioned groove and having abutting ends which overlap the abutting ends of the non-metallic rim, means for drawing the ends of the reinforcing member toward each other and simultaneously drawing the ends of the non-metallic rim toward each other to secure a lens in the rim, whereby the ends of the non-metallic rim are strengthened and held in place by the overlapping ends of the metal reinforcing member.

3. An ophthalmic mounting comprising a non-metallic rim having a lens groove in its inner edge, a groove in its rear edge and abutting ends, a metal reinforcing member in the last mentioned groove and having abutting ends which break joints with the ends of the rim, a shield secured to the reinforcing member and which extends over the abutting ends of the rim, means for drawing the ends of the reinforcing member toward each other and simultaneously drawing the ends of the rim toward each other to secure a lens in the rim, whereby the ends of the non-metallic rim are strengthened and held in place circumferentially and laterally by the overlapping ends of the metal reinforcing member and the shield.

4. An ophthalmic mounting comprising a non-metallic rim having a lens groove, a rectangular shaped groove in its rear edge and abutting ends, a metallic reinforcing member in the last mentioned groove and having abutting ends which break joints with the ends of the rim, a shield secured to the reinforcing member and which extends over and covers the ends of the rim and the ends of the reinforcing member, lugs on the ends of the reinforcing member, a screw extending through one lug and in screw-thread engagement with the other lug, whereby the ends of the rim and the ends of the reinforcing member may be simultaneously drawn toward each other to secure a lens in the rim, and the ends of the rim are greatly strengthened and are held in place against circumferential and lateral movements.

5. An ophthalmic mounting comprising a non-metallic rim having abutting ends, a lens groove and a groove in its rear edge, a metallic reinforcing member in the rear edge groove and having abutting ends which overlap the abutting ends of the rim, a shield secured to one end of the reinforcing member and which extends over and conceals the ends of the rim and reinforcing member, a collar in the rim, a member extending through a hole in the shield and the collar and secured to the reinforcing member, means on the ends of the reinforcing member whereby the ends of the reinforcing member and the ends of the rim are simultaneously drawn toward each other to secure a lens in the rim and the abutting ends of the rim are greatly strengthened and are held in place against circumferential and lateral movements, and the open joint of the rim is concealed by the shield.

In testimony whereof, I have signed my name to this specification.

FREDERICK ARTHUR STEVENS.